(12) United States Patent
Shultz et al.

(10) Patent No.: US 8,829,079 B2
(45) Date of Patent: Sep. 9, 2014

(54) SURFACE-MODIFIED ZIRCONIA NANOPARTICLES

(75) Inventors: Nathan E. Shultz, Lakeland, MN (US); Guy D. Joly, Shoreview, MN (US); Michael D. Determan, Mahtomedi, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 431 days.

(21) Appl. No.: 13/143,978

(22) PCT Filed: Jan. 15, 2010

(86) PCT No.: PCT/US2010/021177
§ 371 (c)(1),
(2), (4) Date: Jul. 11, 2011

(87) PCT Pub. No.: WO2010/085427
PCT Pub. Date: Jul. 29, 2010

(65) Prior Publication Data
US 2011/0288215 A1    Nov. 24, 2011

Related U.S. Application Data

(60) Provisional application No. 61/146,466, filed on Jan. 22, 2009.

(51) Int. Cl.
| | | |
|---|---|---|
| C08K 9/00 | (2006.01) | |
| C09C 3/08 | (2006.01) | |
| C01G 25/02 | (2006.01) | |
| B82Y 30/00 | (2011.01) | |

(52) U.S. Cl.
CPC . *C01G 25/02* (2013.01); *C09C 3/08* (2013.01); *C01P 2002/82* (2013.01); *C01P 2004/64* (2013.01); *C01P 2002/86* (2013.01); *B82Y 30/00* (2013.01); *C01P 2006/60* (2013.01); *C01P 2006/32* (2013.01); *C01P 2002/70* (2013.01)
USPC ............ 523/200; 560/115; 560/125; 560/222

(58) Field of Classification Search
USPC ......................... 523/200; 560/115, 125, 222
See application file for complete search history.

(56) References Cited

U.S. PATENT DOCUMENTS

| | | | |
|---|---|---|---|
| 6,288,172 B1 * | 9/2001 | Goetz et al. .................... | 525/200 |
| 6,376,590 B2 | 4/2002 | Kolb et al. | |
| 6,680,338 B2 | 1/2004 | Montana et al. | |
| 7,156,911 B2 | 1/2007 | Kangas et al. | |
| 7,241,437 B2 | 7/2007 | Davidson et al. | |
| 7,297,810 B2 | 11/2007 | Walker, Jr. et al. | |
| 7,429,422 B2 | 9/2008 | Davidson et al. | |
| 8,512,464 B2 * | 8/2013 | Joly et al. .................. | 106/287.19 |
| 2004/0007146 A1 | 1/2004 | Gutfleisch et al. | |
| 2005/0226966 A1 | 10/2005 | Bringley et al. | |
| 2006/0084278 A1 | 4/2006 | Winter et al. | |
| 2006/0148950 A1 | 7/2006 | Davidson et al. | |
| 2007/0105207 A1 * | 5/2007 | Mosyak et al. ............... | 435/226 |
| 2007/0278179 A1 | 12/2007 | Afzali-Ardakani et al. | |
| 2010/0016465 A1 * | 1/2010 | Van Lelieveld et al. ...... | 523/116 |

FOREIGN PATENT DOCUMENTS

| | | | |
|---|---|---|---|
| WO | WO 2007/104312 A2 | 9/2007 | |
| WO | WO 2009/085926 A2 | 7/2009 | |

OTHER PUBLICATIONS

Creton, Costantino. Pressure-Sensitive Adhesives: An Introductory Course. www.mrs.org/publications/bulletin. Jun. 2003.*
Willems et al., A classification of dental composites according to their morphological and mechanical characteristics. Dent Mater 8:310-319, Sep. 1992.*
Folkers et al., "Self-Assembled Monolayers of Long-Chain Hydroxamic Acids on the Native Oxides of Metals[1]," *Langmuir*, (1995) 11, pp. 813-824.
Lardelli et al., "The Synthesis of Lactones. Part I," *Recueil des Travaux Chimiques des Pays-Bas*, (1967) 86, pp. 481-503.
Miller, "Syntheses and Therapeutic Potential of Hydroxamic Acid Based Siderophores and Analogues," *Chem. Rev.*, (1989) 89 pp. 1563-1579.
Perdew et al., "Generalized Gradient Approximation Made Simple," *Phys. Rev. Letters*, (1996) 77, pp. 3865-3868.
Kresse et al., "Ab initio Molecular Dynamics for Liquid Metals," *J. Phys. Ref. B*, (1993) 47, pp. 588-561.
Kresse et al., "Ab initio Molecular-Dynamics Simulation of the Liquid-Metal-Amorphous-Semiconductor Transition in Germanium," *J. Phys. Rev. B*, (1994) 49, pp. 251-271.
Kresse et al, "Efficiency of Ab-Initio Total Energy Calculations for Metals and Semiconductors Using a Plane-Wave Basis Set," *J. Comput. Mater. Sci.*, (1996) 6, pp. 15-50.
Kresse et al., "Efficient Iterative Schemes for ab initio Total-Energy Calculations Using a Plane-Wave Basis Set," *J. Phys. Rev. B*, (1996) 54, pp. 169-186.
International Search Report for PCT/US2010/021177, pp. 4.

* cited by examiner

*Primary Examiner* — Hannah Pak
(74) *Attorney, Agent, or Firm* — Eric E. Silverman

(57) ABSTRACT

Surface-modified zirconia nanoparticles and methods for making and using the same are provided. The surface-modifiers include non-metallic organic derivatives, comprising at least one hydroxamate functionality, wherein at least some of the non-metallic organic derivatives are attached to at least some of the zirconia nanoparticles.

12 Claims, 4 Drawing Sheets

SURFACE-MODIFIED ZIRCONIA NANOPARTICLES

CROSS REFERENCE TO RELATED APPLICATIONS

This application is a national stage filing under 35 U.S.C. 371 of PCT/US2010/021177, filed 15 Jan. 2010, which claims priority to U.S. Application No. 61/146,466, filed 22 Jan. 2009, the disclosure of which is incorporated by reference in its/their entirety herein.

FIELD

The present disclosure relates to surface-modified zirconia nanoparticles and methods for making and using the same.

BACKGROUND

Zirconia nanoparticles have a high refractive index and are useful in organic matrices to alter optical properties of the matrix. For example, zirconia nanoparticles have been used to increase the index of refraction or to increase the x-ray opacity of the organic matrix, while retaining optical transmission. The extent to which the x-ray opacity and/or refractive index of the organic matrix can be increased is dependent on the percent loading of zirconia in the organic matrix and on characteristics of the zirconia particles such as the percent crystallinity, the crystalline structure, the primary particle size, and the degree of association between the primary particles.

Surface modification of zirconia nanoparticles can be used to prevent or reduce particle agglomeration and to enhance the compatability of the nanoparticles within an organic matrix. Accordingly, zirconia nanoparticles have been treated with a variety of surface modifying agents such as, for example, carboxylic acids and/or silanes. These traditional surface modifiers have their drawbacks. For example, organic matrices containing acrylic acid-derived residues will displace the zirconia-bound carboxylic acid groups with acrylic acid-derived groups. Silane-functionalized zirconia nanoparticles are thermodynamically unfavorable and experimentally challenging to prepare.

SUMMARY

It would be desirable to have surface-modifiers that can strongly and irreversibly attach to zirconia nanoparticles and do not suffer from the drawbacks of traditional surface modifiers. It would also be desirable to have surface-modified zirconia nanoparticles that are compatible with a variety of organic matrices. It is furthermore desirable to have composite materials with enhanced optical properties such as high refractive index or x-ray opacity that include surface-modified zirconia nanoparticles dispersed in organic matrices.

In one aspect, surface-modified nanoparticles are provided that include zirconia nanoparticles and at least one non-metallic organic derivative, comprising at least one hydroxamate functionality, wherein at least some of the non-metallic organic derivatives are attached to at least some of the zirconia nanoparticles.

In another aspect, a method of making surface-modified nanoparticles is provided that includes a method of making surface-modified nanoparticles that includes providing an aqueous sol of acetate-functionalized zirconia nanoparticles; combining at least one non-metallic organic derivative comprising at least one hydroxamate functionality, or a solution thereof, with a sol the to form a mixture; and removing water and displaced acetic acid from the mixture to form surface-modified nanoparticles.

In yet another aspect, a composition is provided that includes an organic matrix and surface-modified zirconia nanoparticles bonded to at least a portion of the organic matrix, wherein the surface-modified nanoparticles comprise at least one non-metallic organic derivative comprising at least one hydroxamate functionality.

The provided surface-modified nanoparticles, methods of making the same, and compositions including the same can produce stable, well-dispersed, non-agglomerated materials that have enhanced optical properties. These enhanced optical properties include high refractive index, high transmission, and/or x-ray opacity.

In this disclosure:

"crystallinity index" refers to the crystalline fraction that is determined by X-ray diffraction analysis;

"high refractive index" refers to materials that have a real component of refractive index above about 1.47;

"hydrothermal" refers to a method of heating an aqueous medium, in a closed vessel, to a temperature above the normal boiling point of the aqueous medium at a pressure that is equal to or greater than the pressure required to prevent boiling of the aqueous medium;

"hydroxamate functionality" refers to at least one hydroxamic acid group and can refer to the protonated hydroxamic acid or deprotonated acid (conjugate base of hydroxamic acid);

"(meth)acrylic" refers to both derivatives of methacrylic acid and/or acrylic acid; "non-metallic" refers to compounds that do not contain any metal element or metalloid elements such as silicon;

"non-metallic organic derivatives containing hydroxamate functionality" refer to derivatives of hydroxamic acid that do not contain any metals within or attached to the backbone of the derivative but may include the metal salts of the hydroxamates;

"zirconia" refers to a various stoichiometries for zirconium oxides, most typically $ZrO_2$, and may also be known as zirconium oxide or zirconium dioxide. The zirconia may contain up to 30 weight percent (wt %) of other chemical moieties such as, for example, $Y_2O_3$ and organic material.

The above summary is not intended to describe each disclosed embodiment of every implementation of the present invention. The brief description of the drawing and the detailed description which follows more particularly exemplify illustrative embodiments.

DETAILED DESCRIPTION

Figure 1:
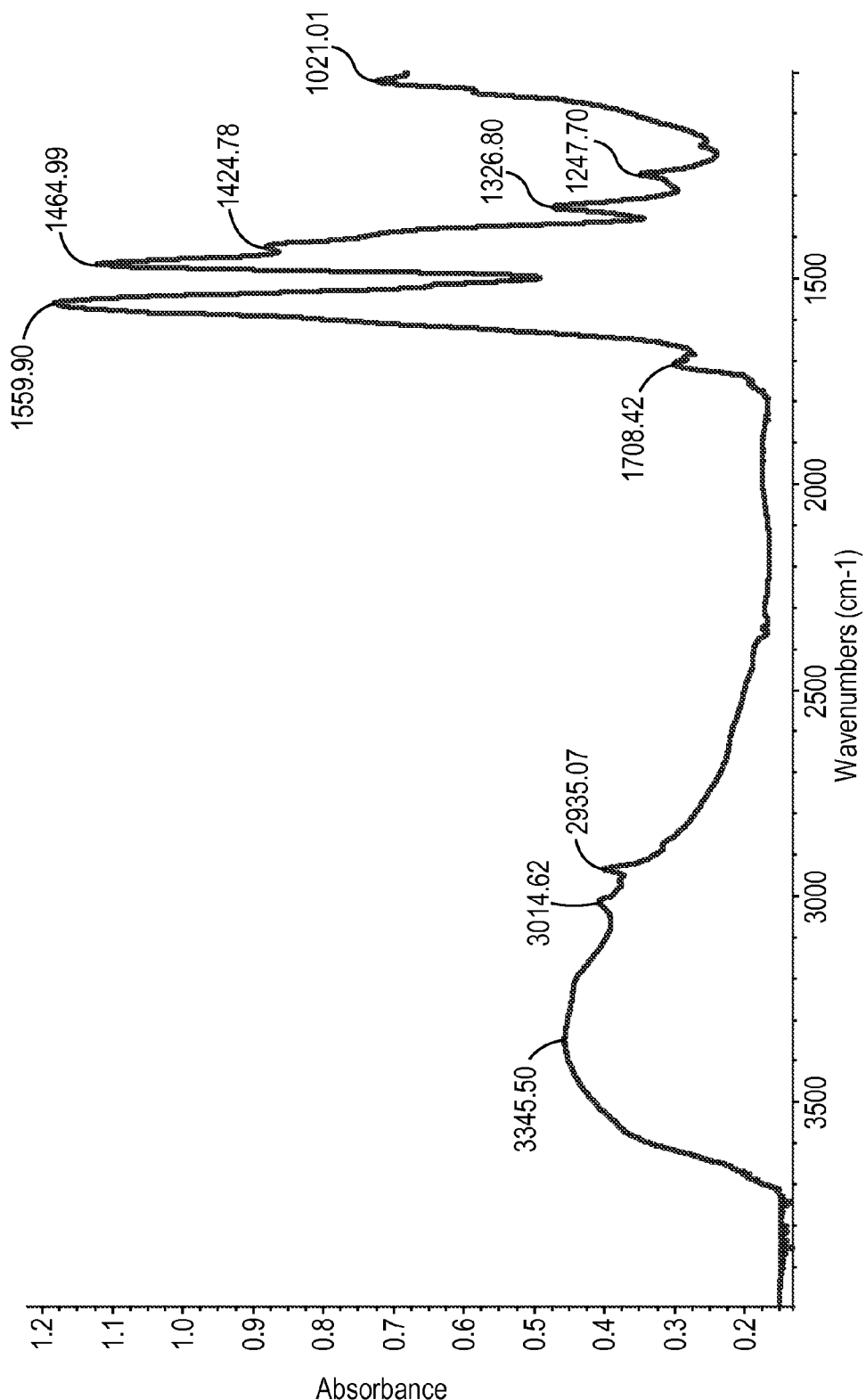
FIG. 1 is a graph of an FTIR spectrum of zirconia with acetic acid groups.

In the following description, reference is made to the accompanying set of drawings that form a part of the description hereof and in which are shown by way of illustration several specific embodiments. It is to be understood that other embodiments are contemplated and may be made without departing from the scope or spirit of the present invention. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Surface-modified nanoparticles are provided that include zirconia nanoparticles. Zirconia nanoparticles can be obtained from zirconia sols that include a plurality of single crystal zirconia particles. In some embodiments, these particles have an average primary particles size of less than 20 nanometers (nm). These sols can be substantially non-associated and can be highly crystalline exhibiting a crystallinity index of about 0.65 or greater. Of the crystalline phase, about 70% or greater can exist in combined cubic and tetragonal crystal lattice structures without a crystal phase stabilizer. Exemplary zirconia sols can be obtained via a hydrothermal method. Zirconia sols and methods of making the same are described, for example, in U.S. Pat. No. 6,376,590 (Kolb et al.), U.S. Pat. No. 7,241,437 and U.S. Pat. No. 7,429,422 (both Davidson et al.). The zirconia nanoparticles in sols of these embodiments can contain yttrium in an amount from about 0.1 wt % to 8 wt % based upon the weight of inorganic oxides in the zirconia particles. The particles can be dispersed in an aqueous medium that includes a carboxylic acid such as, for example, formic acid, acetic acid, propionic acid, butyric acid, or a combination thereof.

The zirconia-containing sols are typically clear. The zirconia-containing sols often have a high optical transmission due to the small size and non-associated form of the primary zirconia particles in the sol. High optical transmission of the sol can be desirable in the preparation of transparent or translucent composite materials. As used herein, "optical transmission" refers to the amount of light that passes through a sample (e.g., a zirconia-containing sol) divided by the total amount of light incident upon the sample. The percent optical transmission may be calculated using the equation $$100(I/I_O)$$

where I is the light intensity passing though the sample and $I_O$ is the light intensity incident on the sample. The optical transmission may be determined using an ultraviolet/visible spectrophotometer set at a wavelength of 600 nm with a 1 cm path length. The optical transmission is a function of the amount of zirconia in a sol. For zirconia-containing sols having about 1 wt % zirconia, the optical transmission is typically at least 70%, at least 80 percent, or at least 90%. For zirconia-containing sols having about 10 wt % zirconia, the optical transmission is typically at least 20%, at least 50%, or at least 70%.

The extent of association between the primary particles can be determined from the hydrodynamic particle size. The hydrodynamic particle size can be measured using Photon Correlation Spectroscopy and is described in more detail in PCT Pat. Appl. US2008/087,385 (Kolb et al.), filed Dec. 12, 2008. The term "hydrodynamic particle size" and "volume-average particle size" are used interchangeably herein. If the particles of zirconia are associated, the hydrodynamic particle size provides a measure of the size of the aggregates and/or agglomerates of primary particles in the zirconia sol. If the particles of zirconia are non-associated, the hydrodynamic particle size provides a measure of the size of the primary particles.

A quantitative measure of the degree of association between the primary particles in the zirconia sol is the dispersion index. As used herein the "dispersion index" is defined as the hydrodynamic particle size divided by the primary particle size. The primary particle size (e.g., the weighted average crystallite size) can be determined using x-ray diffraction techniques and the hydrodynamic particle size (e.g., the volume-average particle size) is determined using Photon Correlation Spectroscopy. As the association between primary particles in the sol decreases, the dispersion index approaches a value of 1 but can be somewhat higher or lower. The zirconia-containing nanoparticles typically have a dispersion index of about 1 to 5, about 1 to 4, about 1 to 3, about 1 to 2.5, or about 1 to 2.

Photon Correlation Spectroscopy can be used to further characterize the zirconia particles in the sol. For example, the intensity of the light scattered by particles is proportional to the sixth power of the particle diameter. Consequently, a light-intensity distribution tends to be more sensitive to larger particles than smaller ones. One type of intensity-based size available from Photo Correlation Spectroscopy is the Z-average Size. It is calculated from the fluctuations in the intensity of scattered light using a cumulants analysis. This analysis also provides a value called the polydispersity index, which is a measure of the breadth of the particle size distribution. The calculations for the Z-average size and Polydispersity Index are defined in the ISO standard document 13321:1996 E.

The zirconia particles tend to have a Z-average size that is no greater than 70 nanometers, no greater than 60 nm, no greater than 50 nm, no greater than 40 nm, no greater than 35 nm, or no greater than 30 nm. The polydispersity index is often less than 0.5, less than 0.4, less than 0.3, less than 0.2, or less than 0.1. A polydispersity index near 0.5 often indicates a broad particle size distribution while a polydispersity index near 0.1 often indicates a narrow particle size distribution.

In addition to the Z-average size and polydispersity index, a complete light-intensity distribution can be obtained during analysis using Photon Correlation Spectroscopy. This can further be combined with the refractive indices of the particles and the refractive index of the suspending medium to calculate a volume distribution for spherical particles. The volume distribution gives the percentage of the total volume of particles corresponding to particles of a given size range. The volume-average size is the size of a particle that corresponds to the mean of the volume distribution. Since the volume of a particle is proportional to the third power of the diameter, this distribution is less sensitive to larger particles than an intensity-based size. That is, the volume-average size will typically be a smaller value than the Z-average size. The zirconia sols typically have a volume-average size that is no greater than 50 nm, no greater than 40 nm, no greater than 30 nm, no greater than 25 nm, no greater than 20 nm, or no greater than 15 nm. The volume-average size is used in the calculation of the dispersion index.

The zirconia-containing nanoparticles can optionally contain yttrium. Any yttrium that is present is typically in the form of yttrium oxide. The presence of yttrium in the zirconia-containing nanoparticle usually facilitates the formation of the cubic/tetragonal phases rather than the monoclinic phase. The cubic and tetragonal phases are often preferred because they tend to have a higher refractive index and x-ray opacity compared to the monoclinic phase. These phases also tend to be more symmetrical, which can be an advantage in some applications when the zirconia-containing nanoparticles are suspended or dispersed in an organic matrix because they have a minimal effect on the viscosity of the organic matrix. Additionally, the percent loading can be higher with the cubic and tetragonal phases.

The mole ratio of yttrium to zirconium (i.e., moles yttrium÷moles zirconium) in the zirconia-containing nanoparticles is often up to 0.25, up to 0.22, up to 0.20, up to 0.16, up to 0.12, up to 0.08. For example, the mole ratio of yttrium to zirconium can be in the range of from 0 to 0.25, from 0 to 0.22, from 0.01 to 0.22, from 0.02 to 0.22, from 0.04 to 0.22, from 0.04 to 0.20, from 0.04 to 0.16, or from 0.04 to 0.12.

Expressed differently as oxides, the zirconia-containing nanoparticles often contain up to 11 mole percent (mol %) $Y_2O_3$ based on the moles of the inorganic oxides (i.e., $Y_2O_3$ plus $ZrO_2$). For example, the zirconia-containing nanoparticles can contain up to 10 mole percent, up to 8 mole percent, up to 6 mol %, or up to 4 mol % $Y_2O_3$ based on the moles of the inorganic oxides. Some zirconia-containing nanoparticles contain from 0 to 11 mol %, from 0 to 10 mol %, from 1 to 10 mol %, from 1 to 8 mol %, or from 2 to 8 mol % $Y_2O_3$ based on the moles of the inorganic oxides.

Expressed in yet another manner, the zirconia-containing nanoparticles often contain up to 20 weight percent (wt %) $Y_2O_3$ based on the weight of the inorganic oxides (i.e., $Y_2O_3$ plus $ZrO_2$). For example, the zirconia-containing nanoparticles can contain up to 18 wt %, up to 16 wt %, up to 12 wt %, up to 10 wt %, or up to 6 wt % $Y_2O_3$ based on the weight of the inorganic oxides. Some zirconia-containing nanoparticles contain from 0 to 20 wt %, from 0 to 18 wt %, from 2 to 18 wt %, from 2 to 16 wt %, or from 2 to 10 wt % $Y_2O_3$ based on the weight of the inorganic oxides.

The zirconia-containing nanoparticles often contain at least some organic material in addition to inorganic oxides. The organic material can be attached to the surface of the zirconia particles and often originates from the carboxylate species (anion, acid, or both) included in the feedstock or formed as a byproduct of the hydrolysis and condensation reactions. That is, the organic material is often sorbed to the surface of the zirconia-containing nanoparticles. The zirconia particles often contain up to 15 wt %, up to 12 wt %, up to 10 wt %, up to 8 wt %, or up to 6 wt % organic material based on the weight of the particles.

The zirconia-containing nanoparticles often contain less than 3 milligrams of an alkali metal such as sodium, potassium, or lithium per gram of zirconium in the nanoparticles. For example, the amount of alkali metal can be less than 2 milligrams (mg) per gram of zirconium, less than 1 mg per gram of zirconium, less than 0.6 mg per gram of zirconium, less than 0.5 mg per gram of zirconium, less than 0.3 mg per gram of mg, less than 0.2 mg per gram of zirconium, or less than 0.1 mg per gram of zirconium.

Likewise, the zirconia-containing nanoparticles often contain less than 3 mg of an alkaline earth such as calcium, magnesium, barium, or strontium per gram of zirconium in the nanoparticles. For example, the amount of alkaline earth can be less than 2 mg per gram of zirconium, less than 1 mg per gram of zirconium, less than 0.6 mg per gram of zirconium, less than 0.5 mg per gram of zirconium, less than 0.3 mg per gram of zirconium, less than 0.2 mg per gram of zirconium, or less than 0.1 mg per gram of zirconium.

The zirconia-containing nanoparticles can be substantially crystalline. Crystalline zirconia tends to have a higher refractive index and higher x-ray scattering capability than amorphous zirconia. Due to the difficulty in separately quantifying cubic and tetragonal crystal structures for small particles using x-ray diffraction (i.e., the (111) peak for cubic zirconia often overlaps with the (101) peak for tetragonal zirconia). If yttrium is present, at least 70% of the total peak area of the x-ray diffraction scan is attributed to a cubic structure, tetragonal structure, or a combination thereof with the balance being monoclinic. For example, at least 75%, at least 80%, or at least 85% of the total peak area of some x-ray diffraction scans can be attributed to a cubic crystal structure, tetragonal crystal structure, or a combination thereof. Cubic and tetragonal crystal structures tend to promote the formation of low aspect ratio primary particles having a cube-like shape when viewed under an electron microscope.

The zirconia particles usually have an average primary particle size no greater than 50 nm, no greater than 40 nm, no greater than 30 nm, no greater than 25 nm, no greater than 20 nm, no greater than 15 nm, or no greater than 10 nm. The primary particle size, which refers to the non-associated particle size of the zirconia particles, can be determined by x-ray diffraction.

Nanoparticles, such as zirconia nanoparticles, typically agglomerate and it can be difficult to achieve good dispersions of them in media, such as aqueous or organic media. In particular, it can be difficult to get dispersed nanoparticles within a polymer matrix due to the tendency of the nanoparticles to associate into agglomerates. Therefore, it can be advantageous to modify the surface of the nanoparticles so that agglomeration becomes thermodynamically unfavorable. Surface modification involves reacting the zirconia particles with a surface modification agent or combination of surface modification agents that attach to the surface of the zirconia nanoparticles and that modify the surface characteristics of the zirconia particles.

Surface modification agents can be represented by the formula A-B where the A group is capable of attaching to the surface of a zirconia particle, and where B is a compatibilizing group. The A group can be attached to the surface by absorption, formation of an ionic bond, formation of a covalent bond, or a combination thereof. Suitable examples of A groups include, for example, hydroxamic acids or salts (hydroxamates) thereof. The compatibilizing groups B can be reactive or nonreactive and can be polar or nonpolar moieties. Polar compatibilizing groups include hydroxyl, amino, thioether, thiol, carboxyl, carbonyl, alkylether, alkynyl, alkenyl, aziridinyl, azidyl, epoxide, halogen groups, and combinations thereof. Nonpolar compatibilizing groups include alkyl, alkylene, heteroalkyl, aryl, arylene, and combinations thereof. Of particular importance are surface-modification agents that have compatibilization groups (B) that are compatible with polymeric systems. For example, surface modification agents that have (meth)acrylate compatibilizing groups can be useful to disperse zirconia nanoparticles in acrylic polymer systems. These agents can be obtained, for example, by reacting a hydroxamate that has a free hydroxyl with 2-isocyanatoethyl methacrylate (IEM) to form an acrylated hydroxamate that will bind to zirconia nanoparticles.

Hydroxamic acids are a well-studied class of compounds. They are known to form self-assembled monolayers on native oxides of metals as described by J. P. Folkers, et al., "Self-Assembled Monolayers of Long-Chain Hydroxamic Acids on Native Oxides of Metals," *Langmuir*, 11, 813 (1998). Hydroxamic acids have been used in medicinal chemistry applications. The biological activity of hydroxamic acids is due to their strong metal-binding capabilities. For example, hydroxamic acids have been used to treat patients with an excessive concentration of iron in their bloodstream. In addition, hydroxamic acids can inhibit many enzymes including proteases, ureases, oxygenases, hydrolases, and peroxidases and can provide antibacterial, antifungal, and insecticidal protection for plants.

Hydroxamic acids can be obtained commercially from a number of chemical suppliers such as, for example, Sigma Aldrich, St. Louis, Mo. Synthetically, hydroxamic acids can be obtained by reaction between a hydroxylamine and a carbonyl-based electrophile, such as an acid chloride. Coupling reactions between a hydroxylamine and a carboxylic acid can be carried out directly using coupling and/or activating agents that are useful in the synthesis of amides. These agents include, for example, carbodiimides. Aldehydes can be reacted with sulfonamides such as N-hydroxybenzenesulfonamide in the presence of base to form hydroxamic acids. Alternatively, hydroxamic acids can be generated from esters and hydroxylamine reagents. Lactones can make good starting materials for directly generating hydroxyl-functionalized hydroxamic acids. This synthetic pathway is described, for example, by G. Lardelli, et al., *Recueil des Travaux Chimiques des Pays-Bas*, 86, 481-503 (1967). Other useful hydroxamic acids can be found, for example, in U.S. Pat. No. 6,680,338 (Montana et al).

The provided surface-modified nanoparticles include at least one non-metallic organic derivative that comprises at least one hydroxamate (derivative of hydroxamic acid) as discussed above. Useful hydroxamates include a number of siderophores (iron-chelating compounds) such as, for example, aspergillic acid and actinonin which is an antibiotic as well other compounds well known to chelate iron. A review of these materials can be found, for example, in a review by M. Miller, *Chem. Rev.* 89, 1563 (1989). Some of these materials have one, two, or even three or more hydroxamate groups.

In some embodiments, the surface-modified nanoparticles include at least one non-metallic organic derivative that has the formula:

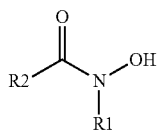
(I)

In this formula, $R^1$ can be hydrogen, an alkyl group, a cycloalkyl group, an aryl group, a heteroaryl group, an alkaryl group, an alkylheteroaryl group or a heterocycloalkyl group. Typically alkyl groups have from about 1 to about 20 carbon atoms and can be branched or unbranched. Cycloalkyl groups typically include 5-12 membered rings such as, for example, cyclopentyl, cyclohexyl, cycloheptyl, cyclooctyl, or cyclododecyl groups. Aryl groups include phenyl, naphthyl, anthracenyl, phenanthenyl, biphenyl, or any other aryl ring systems. $R^2$ can be alkyl, alkylene, heteroalkyl, aryl, arylene, or combinations thereof. Additionally $R^2$ can further include at least one of a hydroxyl, amino, thioether, thiol, carboxy, carbonyl, alkylether, alkynyl, alkenyl, halogen, or combination thereof. $R^2$ can also include additional hydroxamate groups.

To make surface-modified zirconia nanoparticles, an aqueous sol of acetate-functionalized zirconia nanoparticles is provided as described above. A solution is mixed with the sol that includes at least one non-metallic organic derivative that includes at least one hydroxamate functionality. The mixture is then, optionally, heated and water and displaced acetic acid is removed from the mixture to form surface-modified zirconia nanoparticles that can be isolated as a powder or slurry.

In another aspect, a composition is provided that includes an organic matrix and surface-modified zirconia nanoparticles attached to at least a portion of the organic matrix. The surface-modified zirconia nanoparticles include at least one non-metallic organic derivative that includes at least one hydroxamate functionality. The organic matrix can be any polymer or copolymer matrix. The polymer or copolymer matrix can be derived from monomers, oligomers, copolymers, or a combination thereof. Exemplary polymers include poly(meth)acrylates, polyesters, polyurethanes, polystryenes, epoxies, vinyl polymers, (methacrylated) polyesters, and combinations thereof. The surface-modified zirconia nanoparticle sols can also be combined with other types of polymers, for example, polyolefins, polycarbonates, and polyimides.

In some embodiments, surface-modified zirconia nanoparticles can be dispersed and bonded into optically clear organic matrices to produce high refractive index composites. For example, zirconia nanoparticles that have been surface modified with carboxylates or silanes can be incorporated into organic matrices that contain ultraviolet curable monomers employing a bromine-substituted fluorine structure to form materials with refractive indices greater than 1.47. It is contemplated that the hydroxamate-functionalized zirconia nanoparticles will be compatible in these systems as well.

In some embodiments, the organic matrix can be an adhesive composition. Typically the adhesive compositions can be (meth)acrylic pressure-sensitive adhesives. The adhesive compositions can be derived from precursors that include from about 75 to about 99 parts by weight of an alkyl acrylate having 1 to 14 carbons in the alkyl group. The alkyl acrylate can include aliphatic, cycloaliphatic, or aromatic alkyl groups. Useful alkyl acrylates (i.e., acrylic acid alkyl ester monomers) include linear or branched monofunctional acrylates or methacrylates of non-tertiary alkyl alcohols, the alkyl groups of which have from 1 up to 14 and, in particular, from 1 up to 12 carbon atoms. Useful monomers include, for example, 2-ethylhexyl (meth)acrylate, ethyl (meth)acrylate, methyl (meth)acrylate, n-propyl (meth)acrylate, isopropyl (meth)acrylate, pentyl (meth)acrylate, n-octyl (meth)acrylate, isobutyl (meth)acrylate, isononyl (meth)acrylate, n-butyl (meth)acrylate, isobutyl (meth)acrylate, hexyl (meth) acrylate, n-nonyl (meth)acrylate, isoamyl (meth)acrylate, n-decyl (meth)acrylate, isodecyl (meth)acrylate, dodecyl (meth)acrylate, isobornyl (meth)acrylate, cyclohexyl (meth) acrylate, phenyl meth(acrylate), benzyl meth(acrylate), and 2-methylbutyl (meth)acrylate, biphenyloxyethyl acrylate (BPEA), and combinations thereof.

The provided adhesive composition precursors can also include from about 1 to about 25 parts of a copolymerizable polar monomer such as (meth)acrylic monomer containing carboxylic acid, amide, urethane, or urea functional groups. Useful carboxylic acids include acrylic acid and methacrylic acid. Weak polar monomers like N-vinyl lactams may also be included. A useful N-vinyl lactam is N-vinyl caprolactam. In general, the polar monomer content in the adhesive can include less than about 10 parts by weight or even less than about 5 parts by weight of one or more polar monomers. Useful amides include N-vinyl caprolactam, N-vinyl pyrrolidone, (meth)acrylamide, N-methyl (meth)acrylamide, N,N-dimethyl acrylamide, N,N-dimethyl meth(acrylamide), and N-octyl (meth)acrylamide.

The pressure sensitive adhesive can be inherently tacky. If desired, tackifiers can be added to the precursor mixture before formation of the pressure sensitive adhesive. Useful tackifiers include, for example, rosin ester resins, aromatic hydrocarbon resins, aliphatic hydrocarbon resins, and terpene resins. In general, light-colored tackifiers selected from hydrogenated rosin esters, terpenes, or aromatic hydrocarbon resins can be used.

Other materials can be added for special purposes, including, for example, oils, plasticizers, antioxidants, UV stabilizers, pigments, curing agents, polymer additives, and other additives provided that they do not significantly reduce the optical clarity of the pressure sensitive adhesive.

The provided adhesive compositions (that include surface-modified zirconia nanoparticles) may have additional components added to the precursor mixture. For example, the mixture may include a multifunctional crosslinker. Such crosslinkers include thermal crosslinkers which are activated during the drying step of preparing solvent coated adhesives and crosslinkers that copolymerize during the polymerization step. Such thermal crosslinkers may include multifunctional isocyanates, aziridines, multifunctional (meth)acrylates, and epoxy compounds. Exemplary crosslinkers include difunctional acrylates such as 1,6-hexanediol diacrylate or multifunctional acrylates such as are known to those of skill in the art. Useful isocyanate crosslinkers include, for example, an aromatic diisocyanate available as DESMODUR L-75 from Bayer, Cologne, Germany. Ultraviolet, or "UV", activated crosslinkers can also be used to crosslink the pressure sensitive adhesive. Such UV crosslinkers may include benzophenones and 4-acryloxybenzophenones.

In addition, the precursor mixtures for the provided adhesive compositions can include a thermal or a photoinitiator. Examples of thermal initiators include peroxides such as benzoyl peroxide and its derivatives or azo compounds such as VAZO 67, available from E. I. du Pont de Nemours and Co. Wilmington, Del., which is 2,2'-azobis-(2-methylbutyronitrile), or V-601, available from Wako Specialty Chemicals, Richmond, Va., which is dimethyl-2,2'-azobisisobutyrate. A variety of peroxide or azo compounds are available that can be used to initiate thermal polymerization at a wide variety of temperatures. The precursor mixtures can include a photoinitiator. Particularly useful are initiators such as IRGACURE 651, available from Ciba Chemicals, Tarrytown, N.Y., which is 2,2-dimethoxy-2-phenylacetophenone. Typically, the crosslinker, if present, is added to the precursor mixtures in an amount of from about 0.05 parts by weight to about 5.00 parts by weight based upon the other constituents in the mixture. The initiators are typically added to the precursor mixtures in the amount of from 0.05 parts by weight to about 2 parts by weight. The precursor mixtures can be polymerized and/or cross-linked using actinic radiation or heat to form the adhesive composition as described above and in the Examples below.

The pressure-sensitive adhesive precursors can be blended with the provided surface-modified zirconia nanoparticles to form an optically transparent or translucent mixture. Typically, the mixtures can contain up to about 25 wt % zirconia or even more. The mixture can be polymerized by exposure to heat or actinic radiation (to decompose initiators in the mixture). This can be done prior to the addition of a cross-linker to form a coatable syrup to which, subsequently, one or more crosslinkers, and additional initiators can be added, the syrup can be coated on a liner, and cured (i.e., cross-linked) by an addition exposure to initiating conditions for the added initiators. Alternatively, the crosslinker and initiators can be added to the monomer mixture and the monomer mixture can be both polymerized and cured in one step. The desired coating viscosity can determine which procedure used. The disclosed adhesive compositions or precursors may be coated by any variety of known coating techniques such as roll coating, spray coating, knife coating, die coating, and the like. Alternatively, the adhesive precursor composition may also be delivered as a liquid to fill the gap between the two substrates and subsequently be exposed to heat or UV to polymerize and cure the composition. The thickness of the adhesive layer in the articles of disclosure tends to be at greater than about 5 micrometers (μm), greater than about 10 μm, greater than about 15 μm, or even greater than about 20 μm. The thickness is often less than about 1000 μm, less than about 250 μm, less than about 200 μm, or even less than about 175 μm. For example, the thickness can be from about 5 to about 1000 μm, from about 10 to about 500 μm, from about 25 to about 250 μm, or from about 50 to about 175 μm.

In some embodiments, compositions that include surface-modified zirconia nanoparticles can be radioopaque. By radioopaque it is meant that the compositions absorb or scatter X-ray radiation. These materials can be useful, for example, in dental or medical applications.

Objects and advantages of this invention are further illustrated by the following examples, but the particular materials and amounts thereof recited in these examples, as well as other conditions and details, should not be construed to unduly limit this invention.

EXAMPLES

A list of materials employed in the below examples is provided in Table 1. Commercial reagents and solvents were used as received.

TABLE 1

Materials List

| Name | Abbreviation | Available From |
|---|---|---|
| Acetone | | EMD Chemicals Inc. Gibbstown, NJ, USA |
| Acrylic Acid | AA | BASF Corporation, Parsippany, NJ, USA. |
| Adipic Acid | | Sigma-Aldrich Milwaukee, WI, USA |
| Biphenyloxy Ethyl Acrylate | BPEA | Toagosei America Inc. West Jefferson, Ohio, USA |
| 2-(p-Butoxyphenyl)acetohydroxamic acid | Bufexamac | Sigma-Aldrich Milwaukee, WI, USA |
| ε-Caprolactone | | Sigma-Aldrich Milwaukee, WI, USA |
| 2,2-dimethoxy-1,2-diphenylethan-1-one | IRGACURE 651 | Ceiba-Geigy, Hawthorne, NY, USA |
| Dimethyl Formamide | DMF | EMD Chemicals Inc. Gibbstown, NJ, USA |
| (+/−)-Dodecanolactone | | Sigma-Aldrich Milwaukee, WI, USA |
| Ethyl Acetate | | EMD Chemicals Inc. Gibbstown, NJ, USA |
| D-(+)-Gluconic Acid-δ-Lactone | | Alfa Aesar Ward Hill, MA, USA |
| Glutaric Anhydride | | Alfa Aesar Ward Hill, MA, USA |
| 1,6-Hexanedioic Acid | | Sigma Aldrich Milwaukee, WI, USA |
| Hydroxylamine (50 wt % Solution in water) | | Alfa Aesar Ward Hill, MA, USA |
| 2-Isocyanatoethyl Methacrylate | IEM | Sigma-Aldrich Milwaukee, WI, USA |
| Iso-octyl acrylate | IOA | CPS Chemical Company, Old Bridge, NJ, USA. |
| Isopropanol | IPA | Alfa Aesar Ward Hill, MA, USA |

TABLE 1-continued

Materials List

| Name | Abbreviation | Available From |
|---|---|---|
| 3-Isopropenyl-α,α-Dimethylbenzyl Isocyanate | IPI | Sigma-Aldrich Milwaukee, WI, USA |
| Itaconic Anhydride | | TCI America Portland, OR, USA |
| 1-Methoxy-2-Propanol | MPA | J. T. Baker Phillipsburg, NJ, USA |
| (+/−)-γ-Phenyl-γ-Butyrolactone | | Alpha Aesar Ward Hill, MA, USA |
| NWChem, A Computational Chemistry Package for Parallel Computers, Version 5.0 (2006) | | Pacific Northwest National Laboratory Richland, WA, USA. |
| Tetrahydrofuran | THF | EMD Chemicals Inc. Gibbstown, NJ, USA |
| Tetrahydrofuran, Ultra-Pure | THF | Mallinckrodt Baker, Inc. Phillipsburg, NJ, USA |
| $ZrO_2$ Aqueous Sol | | Synthesis provided below. |

Synthesis of $ZrO_2$ Aqueous Sol

The $ZrO_2$ aqueous sol used in the below examples was prepared according to the procedure outlined in Example 6 of U.S. Pat. No. 7,429,422 (Davidson et al.). In a glass vessel, yttrium acetate hydrate (51.4 grams) was dissolved in Zirconium Acetate Solution (2,000 grams) and the solution was concentrated to 60 percent solids using a rotary evaporator. Zirconium Acetate Solution is an aqueous solution of zirconium acetate containing 14.8 wt % Zr that is available from Nyacol Nano Technologies, Inc., Ashland, Mass. The concentrate was diluted with sufficient DI water to give a 12.5 wt % solution (first feedstock).

The first feedstock was pumped at a rate of 80 mL/min through 100 feet (30 meters) of stainless-steel tubing that was immersed in a bath of oil heated to 206° C. The stainless-steel tubing had an outer diameter of 0.25 inch (0.64 cm) and a wall thickness of 0.035 inch (0.089 cm). Following the reactor tube, the material passed through a coil of an additional 20 feet (6 meters) of stainless-steel tubing that was immersed in an ice-water bath to cool the material. The stainless-steel tubing has an outer diameter of 0.25 inch (0.64 cm) and a wall thickness of 0.035 inch (0.089 cm). A backpressure regulator valve was used to maintain an exit pressure of 240 to 310 psig (1.76 to 2.24 MPa). The product was a liquid suspension of fine particles of a white solid. The percent conversion of the zirconium-containing intermediate was 52%.

The liquid suspension was concentrated to 15 wt % solids using a rotary evaporator. This concentrate was pumped at a rate of 15 mL/min through 100 feet (30 meters) of stainless-steel tubing that was immersed in a bath of oil heated to 206° C. The stainless-steel tubing had an outer diameter of 0.25 inch (0.64 cm) and a wall thickness of 0.035 inch (0.089 cm). Following the reactor tube, the material passed through a coil of an additional 20 feet (6 meters) of stainless-steel tubing that was immersed in an ice-water bath to cool the material. The stainless-steel tubing had an outer diameter of 0.25 inch (0.64 cm) and a wall thickness of 0.035 inch (0.089 cm). A backpressure regulator valve was used to maintain an exit pressure of 250 to 300 psig (1.83 to 2.17 MPa). The product was a zirconia aqueous sol ($ZrO_2$ sol).

Methods Employed
Periodic Boundary Condition Density Functional Theory (PBC-DFT) Computational Method.

PBC-DFT was used to examine the bonding of functional groups to the surface of zirconia. The surface of the nanoparticle was represented as a 2D-periodic slab. The slab was five layers thick and cleaved along a Miller plane. The calculations were periodic in three dimensions, but a 20 Å layer of vacuum was included to prevent the slabs from interacting with each other in the z-direction. As such, the slab had 2D periodicity. The isolated molecules were calculated in a periodic box that had an edge length of 11 Å. The length was large enough to prevent the molecules from interacting with each other.

The calculations employed a PBE density functional (Perdew, J. P.; Burke, K.; Ernzerhof, M.; *Phys. Rev. Lett.* 1996, 3865, 77) as implemented in the VASP computer program (Kresse, G.; Hainer, J. *Phys. Rev. B* 1993, 588, 47; Kresse, G.; Hafner, J. *Phys. Rev. B* 1994, 251, 49; Kresse, G.; Furthmueller, J. *Comput. Mater. Sci.* 1996, 15, 6; Kresse, G.; Furthmueller, J. *Phys. Rev. B* 1996, 11 169, 54). The pseudopotentials used were of the plane-wave augmented wave type and distributed with the VASP computer program. The 4s4p electrons of Zr were treated explicitly with the pseudopotential. A plane wave cutoff of 400 eV and 3×3×1 k-point mesh was used. The 3×3×1 scheme was chosen by converging the total energy to within 1 meV. The pseudopotentials and plane wave cutoffs were identical to those used for the slab calculations, but a 1×1×1 k-point mesh was used. The bond energies (BE) were calculated according to Eq. 1

$$BE = E(Slab) + E(Molecule) - E(Slab + Molecule) \quad (1)$$

where E(Slab+Molecule), E(Slab), and E(Molecule) are the electronic energies of the complex, isolated slab, and isolated molecule, respectively. In all cases, the geometries were optimized to their respective minima. The current implementations of PBC-DFT calculate peak positions for vibrational frequencies, but they do not calculate peak intensities. The PBC-DFT methods also do not allow for the calculations on systems with a non-zero net charge. For these two types of calculations, non-periodic DFT methods with Gaussian basis sets were used. The PBE functional was used with the 6-31+G(d,p) basis set. The calculations were performed with NWChem version 5.0.

Fourier Transform Infrared Spectroscopy (FTIR).

Fourier Transform Infrared Spectroscopy (FTIR) measurements were taken on a Nicollet FT-IR instrument. Samples were prepared according to the cast film technique. Using this technique, a zirconia solution was prepared by dissolving zirconia nanoparticles in a compatible solvent (e.g., 1-methoxy-2-propanol). One to two drops of methanol were dropped onto a $CaF_2$ salt plate, followed by one to two drops of zirconia solution. The solution was then evaporated to dryness, and the film was analyzed directly. The analysis was repeated to reduce errors due to varying film thickness. The salt plate was prewetted with methanol and the sol was dropped out of 1-methoxy-2-propanol.

Proton Nuclear Magnetic Resonance Spectroscopy.

Proton nuclear magnetic resonance ($^1H$ NMR) spectra and carbon nuclear magnetic resonance ($^{13}C$ NMR) spectra were recorded on a 400 MHz spectrometer. Chemical shifts for protons are reported in parts per million downfield from tetramethylsilane and are referenced to residual protium in the NMR solvent ($CHCl_3$: δ 7.26; $(CD_2H)_2SO$: δ 2.50; $CD_2HOH$: δ 3.51). Chemical shifts for carbon are reported in parts per million downfield from tetramethylsilane and are referenced to the carbon resonances of the solvent ($CDCl_3$: δ 77.16; $(CD_3)_2SO$: δ 39.52; $CD_3OD$: δ 49.00). Data are presented as follows: chemical shift, integration, multiplicity (br=broad, s=singlet, d=doublet, t=triplet, q=quartet, quint=quintuplet, m=multiplet), coupling constants in Hertz (Hz), and assignment.

Thermal Gravimetric Analysis (TGA).

The percent conversion of the zirconium-containing intermediate and the weight percent inorganic oxides were determined by thermal gravimetric analysis using a Model 2950 TGA from TA Instruments (New Castle, Del.).

The percent conversion of the zirconium-containing sample under analysis is given by the following equation % Conversion=$100(A-B)/(A-C)$ where A is the percent weight loss of the feedstock, B is the percent weight loss of the zirconium-containing sample under analysis, and C is the percent weight loss of a zirconia-containing standard known or believed to be completely converted.

To determine the percent weight loss, a sample of the feedstock, a sample of the zirconia-containing sample under analysis and the zirconia-containing standard were each dried at 120° C. in an oven for 30 minutes analysis. Each sample was in the range of 3 to 6 grams. Each dried sample (e.g., 30 to 60 mg) was equilibrated at 85° C. in the TGA. The temperature was then increased at a rate of 20° C./minute to 200° C., held at 200° C. for 20 minutes, increased at a rate of 20° C./minute to 900° C., and held at 900° C. for 20 minutes. The organic material was volatilized between 200° C. and 900° C. leaving only the inorganic oxides such as $ZrO_2$ and $Y_2O_3$. The percent weight loss was calculated using the following equation.

% weight loss=$100$(%-weight$_{200C}$-%-weight$_{900C}$)/%-weight$_{900C}$

The %-weight$_{200C}$ was calculated from the weight of each sample at 200° C. (weight$_{200C}$) and from the weight of each dried sample (weight$_{dry}$) used for the analysis (e.g., sample dried at 120° C. before analysis).

%-weight$_{200C}$=$100$(weight$_{200C}$)/weight$_{dry}$

The %-weight$_{900C}$ was calculated from the weight of each sample at 900° C. (weight$_{900C}$) and from the weight of each dried sample (weight$_{dry}$) used for the analysis (e.g., sample dried at 120° C. before analysis).

%-weight$_{900C}$=$100$(weight$_{900C}$)/weight$_{dry}$

The weight percent inorganic oxide was calculated from the weight percent solids and the weight percent oxide at 900° C. That is, the weight percent inorganic oxide can be calculated using the following equation.

wt-% inorganic oxides=(wt-% solids)(%-weight$_{900C}$)/100

Index of Refraction.

The refractive index was measured using an Abbe refractometer commercially available from Milton Roy Co. (Ivyland, Pa.).

Surface Studies

Comparative Example 1

Acetic Acid Functionalized Zirconia

PBC-DFT was used to predict the configuration of acetic acid bound to surface-modified zirconia. The analysis was conducted using the 101 and 001 surfaces of tetragonal zirconia, as illustrated in FIG. 1a-1b. These surfaces were chosen as the likely surface state for tetragonal zirconia. Numerous configurations representing the various ways acetic acid might bind to the surface of zirconia were constructed. Several of the configurations also included water. All of these configurations were optimized and the stable configurations, shown in FIGS. 2a-2e were identified. FIGS. 2a-2c are computer-optimized structural diagrams for acetic acid bonded to the 101 face of tetragonal zirconia. FIGS. 2d-2f are computer-optimized structural diagrams for acetic acid bonded to the 001 face of tetragonal zirconia. The calculated bond energy (acetic acid bound to zirconia) and C—O harmonic frequencies for each of the stable configurations are summarized in Table

TABLE 2

Calculated Bond Energies (Acetic Acid bound to Zr)

| Structure | Description | Bond Energy (eV) | $v_{as}$(C—O) cm$^{-1}$ | $v_s$(C—O) cm$^{-1}$ | Δ cm$^{-1}$ |
|---|---|---|---|---|---|
| | | 101 | | | |
| (a) | Bidentate | 1.36 | 1551 | 1395 | 156 |
| (b) | Ontop | 0.85 | 1476 | 1363 | 113 |
| (c) | +H$_2$O | 1.88 | 1525 | 1337 | 188 |
| (d) | +OH | 1.10 | 1474 | 1394 | 80 |
| | | 001 | | | |
| (e) | Bridge | 1.22 | 1563 | 1325 | 238 |
| (f) | Bidentate | 0.76 | 1599 | 1333 | 266 |
| Exp. | | | 1560 | 1327 | 233 |

As a comparison, acetic acid functionalized zirconia was prepared according to the above described procedure (See ZrO2 aqueous sol). The FT-IR spectrum for the acetic acid functionalized zirconia is shown in FIG. 1, and the experimental fundamental frequencies for the C—O stretches are summarized in the last row of Table 1. The notable peaks in the spectra are at 1560, 1465, 1425, and 1327 cm$^{-1}$. Generally, the $v_{as}$(C—O) band should appear between 1610 and 1550 cm$^{-1}$, and the $v_S$(C—O) band should appear between 1400 and 1300 cm$^{-1}$. The $v_{as}$(C—O) and $v_S$(C—O) peaks in the spectra appear at 1560 and 1327 cm$^{-1}$, respectively. The remaining peaks, 1465 and 1425 cm$^{-1}$, are assigned to the CH$_n$ deformation band and the characteristic CH$_n$ vibrations of a CH$_n$ bonded to a carboxylic acid. These assignments were made by literature data (Bellamy, L. J., *The Infra-red Spectra of Complex Molecules*; John Wiley & Sons: New York, 1975) and animating the calculated frequencies. The experimental C—O frequencies best correlated with the theoretical C—O frequencies of Structure (e). This suggests that the configuration of acetic acid on the surface of zirconia may be similar to that depicted in FIG. 2(e).

Synthesis Hydroxamic Acids

All ring-opening reactions were performed in round-bottomed flasks using unpurified commercial reagents. The flasks were gently sealed with a plastic cap, and the reactions were run under an ambient atmosphere with magnetic stirring.

Preparatory Example 1

Reaction of ε-Caprolactone with Hydroxylamine

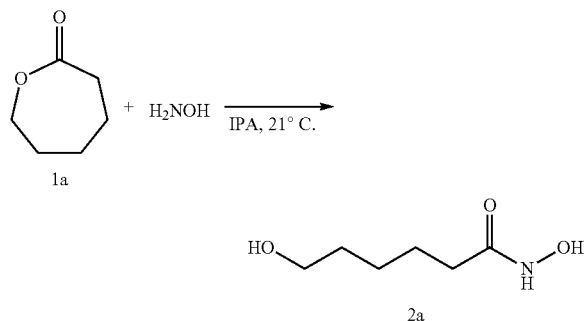

A 2-L round-bottomed flask equipped with a magnetic stir bar was charged with ε-caprolactone 1a (309.6 g, 2713 mmol). Isopropanol (680 mL) was added with stirring and the mixture became homogeneous. The flask was placed in a room-temperature (21° C.) water bath. A 50 wt % solution of hydroxylamine in water (160 mL, 179.2 g, 2713 mmol) was added to the reaction mixture. The reaction vessel warmed slightly and was gently capped with a yellow plastic cap. After 8 days, the clear, colorless, and homogeneous reaction mixture was concentrated to dryness in vacuo to a white solid. The solid was broken up/powdered using a spatula. Ethyl acetate (600 mL) was added and the heterogeneous mixture was stirred for 16 h. The white solid was collected by vacuum filtration and washed with ethyl acetate (250 mL). Residual solvent was removed by high vacuum to provide 2a (363.11 g, 2467 mmol, 90%) as a white powder. $^1$H NMR (400 MHz, CD$_3$OD) δ 3.55 (2H, t, J=6.5 Hz, CH$_2$OH), 2.10 (2H, t, J=7.4 Hz, CH$_2$C=O), 1.64 (2H, app. quin., J=7.5 Hz, CH$_2$), 1.59-1.50 (2H, m, CH$_2$), 1.43-1.33 (2H, m, CH$_2$); $^{13}$C NMR (101 MHz, CD$_3$OD) δ 172.9, 62.7, 33.8, 33.2, 26.6, 26.4; MS (ES) m/z for C$_6$H$_{12}$NO$_3$ [M+H]$^-$ calcd. 146.1. found 146.2.

Preparatory Example 2

Reaction of (+/−)-Dodecanolactone with Hydroxylamine

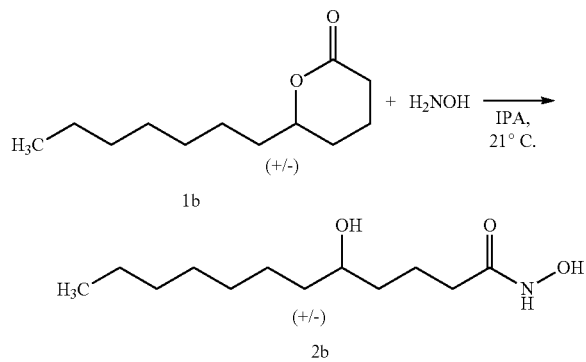

A 1-L round-bottomed flask equipped with a magnetic stir bar was charged with isopropanol (340 mL). (+/−)-Dodecanolactone 1b (67.2 g, 339 mmol) was added with stirring and the mixture became homogeneous. A 50 wt % solution of hydroxylamine in water (20 mL, 22.4 g, 339 mmol) was added to the reaction mixture. The reaction vessel warmed slightly and was gently capped with a yellow plastic cap. After 3 days, the heterogeneous reaction mixture was concentrated to dryness in vacuo to a white solid. The solid was recrystallized from ethyl acetate (200 mL). The white solid was collected by vacuum filtration and washed with ethyl acetate (100 mL). Residual solvent was removed by high vacuum to provide 2b (37.83 g, 163.5 mmol, 48%) as white flakes. $^1$H NMR (400 MHz, DMSO) δ 10.30 (1H, s, NHOH), 8.64 (1H, s, NHOH), 4.26 (1H, d, J=5.3 Hz, CHOH), 1.91 (2H, t, J=7.4 Hz, CH$_2$C=O), 1.65-1.52 (1H, m, aliphatic CH), 1.52-1.40 (1H, m, aliphatic CH), 1.38-1.16 (14H, m, aliphatic CH), 0.86 (3H, app. t, J=6.6 Hz, CH$_2$CH$_3$); $^{13}$C NMR (101 MHz, DMSO) δ 169.2, 69.3, 37.2, 36.6, 32.4, 31.3, 29.2, 28.8, 25.3, 22.1, 21.6, 14.0; MS (ES) m/z for C$_{12}$H$_{24}$NO$_3$ [M+H]$^-$ calcd. 230.2. found 230.2.

Preparatory Example 3

Reaction of (+/−)-γ-Phenyl-γ-Butyrolactone with Hydroxylamine

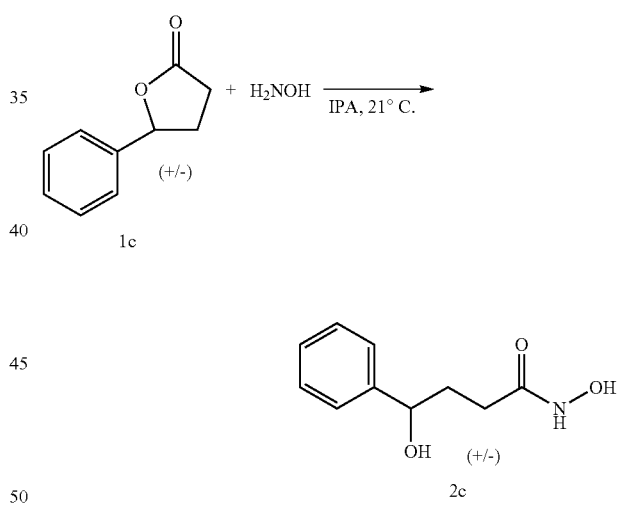

A 250 mL round-bottomed flask equipped with a magnetic stir bar was charged with isopropanol (85 mL). (+/−)-γ-Phenyl-γ-butyrolactone 1c (13.75 g, 84.8 mmol) was added with stirring and the mixture became homogeneous. A 50 wt % solution of hydroxylamine in water (5.0 mL, 5.6 g, 84.8 mmol) was added to the reaction mixture. The reaction vessel was gently capped with a yellow plastic cap. After 13 days, the clear, very pale yellow and homogeneous reaction mixture was concentrated to dryness in vacuo to a very pale yellow, viscous oil. Residual solvent was removed by high vacuum to provide crude 2c (42.23 g, 286.9 mmol, 85%) as a very pale yellow, viscous oil. $^1$H NMR (400 MHz, CD$_3$OD) δ 7.42-7.16 (5H, m, ArH), 4.64 (1H, t, J=6.5 Hz, ArCH(OH)CH$_2$), 2.23-2.10 (2H, m, CH$_2$C=O), 2.04-1.94 (2H, m, CH$_2$CH$_2$C=O); $^{13}$C NMR (101 MHz, CD$_3$OD) δ 172.7, 145.9, 129.3, 128.4, 127.0, 74.2, 35.9, 30.2; MS (ES) m/z for C$_{10}$H$_{12}$NO$_3$ [M+H]$^-$ calcd. 194.1. found 194.2.

Preparatory Example 4

Reaction of D-(+)-Gluconic Acid-δ-Lactone with Hydroxylamine

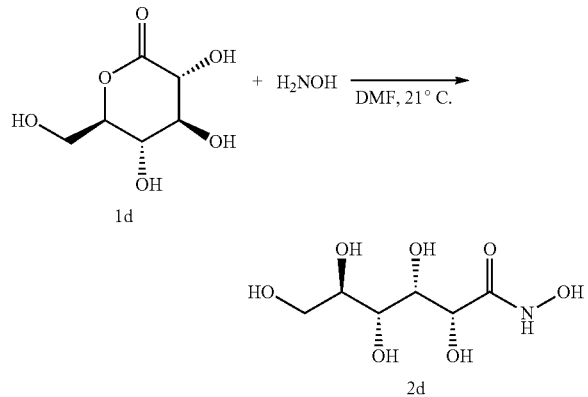

A 2 L round-bottomed flask equipped with a magnetic stir bar was charged with D-(+)-gluconic acid-δ-lactone 1d (120.8 g, 678 mmol). Dimethyl formamide (680 mL) was added with stirring. Most, but not all, of the lactone dissolved. A 50 wt % solution of hydroxylamine in water (40 mL, 44.8 g, 678 mmol) was added to the reaction mixture. The reaction vessel was gently capped with a yellow plastic cap. After 4 days, the heterogeneous reaction mixture was concentrated to dryness in vacuo to provide a white solid. The solid was broken up/powdered using a spatula. Isopropanol (300 mL) was added and the heterogeneous mixture was stirred for 16 h. The white solid was collected by vacuum filtration and washed with isopropanol (150 mL). Residual solvent was removed by high vacuum to provide 2d (129.7 g, 614 mmol, 91%) as a white powder. $^1$H NMR (400 MHz, DMSO) δ 10.36 (1H, s, NHOH), 8.73 (1H, s, NHOH), 5.17 (1H, d, J=5.5 Hz, OH), 4.51 (1H, d, J=5.3 Hz, OH), 4.42 (1H, d, J=5.9 Hz, OH), 4.35 (1H, d, J=6.9 Hz, OH), 4.32 (1H, app. t, J=5.7 Hz, OH), 3.97 (1H, app. t, J=5.2 Hz, CH), 3.9-3.85 (1H, m, CH), 3.6-3.55 (1H, m, CH), 3.48-3.43 (1H, m, CH), 3.43-3.33 (2H, m, CH); $^{13}$C NMR (101 MHz, DMSO) δ 168.9, 72.7, 71.7, 71.5, 70.3, 63.5; MS (ES) m/z for C$_6$H$_{12}$NO$_7$ [M–H]$^-$ calcd. 210.1. found 210.0.

Preparatory Example 5

Reaction of Glutaric Anhydride with Hydroxylamine

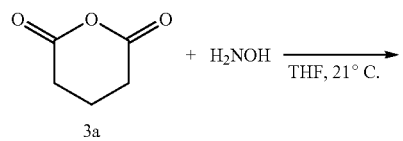

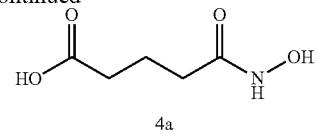

A 1 L round-bottomed flask equipped with a magnetic stir bar was charged with glutaric anhydride 3a (38.69 g, 339 mmol). Tetrahydrofuran (170 mL) was added with stirring and the mixture became homogeneous. The flask was placed in a room-temperature (21° C.) water bath. A 50 wt % solution of hydroxylamine in water (20.0 mL, 11.2 g, 339 mmol) was added to the reaction mixture. The reaction vessel warmed slightly and was gently capped with a yellow plastic cap. After 3 days, the clear, very pale yellow and homogeneous reaction mixture was concentrated to dryness in vacuo to a very pale tan solid. The solid was broken up/powdered using a spatula. Ethyl acetate (350 mL) was added and the heterogeneous mixture was stirred for 16 h. The white solid was collected by vacuum filtration and washed with ethyl acetate (250 mL). Residual solvent was removed by high vacuum to provide 4a (46.87 g, 318.6 mmol, 94%) as a white solid. $^1$H NMR (400 MHz, CD$_3$OD) δ 2.33 (2H, t, J=7.4 Hz, CH$_2$C=O), 2.15 (2H, t, J=7.4 Hz, CH$_2$C=O), 1.89 (2H, app. quin., J=7.4 Hz, CH$_2$CH$_2$CH$_2$); $^{13}$C NMR (101 MHz, CD$_3$OD) δ 176.7, 172.3, 33.9, 32.8, 22.1; MS (ES) m/z for C$_5$H$_8$NO$_4$ [M+H]$^-$ calcd. 146.0. found 146.0.

Preparatory Example 6

Reaction of Itaconic Anhydride with Hydroxylamine

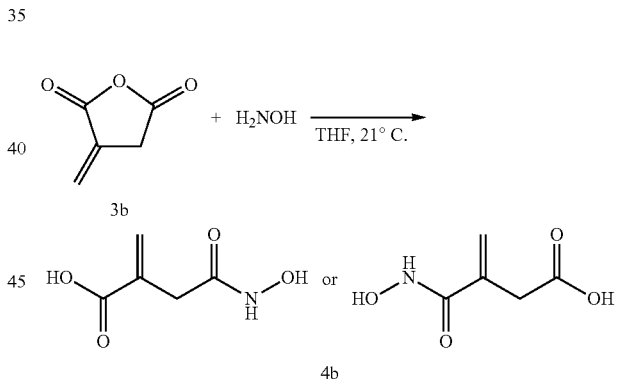

A 250 mL round-bottomed flask equipped with a magnetic stir bar was charged with a 50 wt % solution of hydroxylamine in water (20.0 mL, 11.2 g, 339 mmol). Tetrahydrofuran (100 mL) was added with stirring and the mixture became homogeneous. Itaconic anhydride 3b (38.00 g, 339 mmol) was added to the reaction mixture over a period of 2 minutes. The flask was placed in a room-temperature (21° C.) water bath. The reaction vessel warmed and was gently capped with a yellow plastic cap. After 20.5 hours, the clear, very pale yellow and homogeneous reaction mixture was concentrated to dryness in vacuo to a pale yellow solid. Acetone (200 mL) was added and the heterogeneous mixture was stirred for 3 h. The white solid was collected by vacuum filtration and washed with acetone (200 mL). Residual solvent was removed by high vacuum to provide 4b (24.71 g, 170.3 mmol, 50%) as a white solid. $^1$H NMR (400 MHz, CD$_3$OD) δ 6.32 (1H, s, CH$_2$C=C), 5.79 (1H, s, CH$_2$C=C), 3.12 (2H, s, $CH_2C=O$); $^{13}C$ NMR (101 MHz, $CD_3OD$) δ 170.0, 169.3, 136.0, 129.2, 36.9; MS (ES) m/z for $C_5H_6NO_4$ [M+H]⁻ calcd. 144.0. found 144.0.

Hydroxamic Functionalized Zirconia Nanoparticles

Example 1

Bufexamac Functionalized Zirconia Nanoparticles

Bufexamac functionalized zirconia was prepared by (1) adding ~1 gram of $ZrO_2$ aqueous sol (32.77% solids) to 2 mL of either DMF or MPA, (2) dissolving 1 equivalent (1.4 mmol/g $ZrO_2$) of bufexamac in 1.5 mL of either DMF or MPA, and (3) and pouring the bufexemac solution into the $ZrO_2$ sol. (4) The solution was stirred for 1 hour and heated under $N_2$ to 105° C. The solution was heated to 105° C. to remove water and displaced acetic acid, but the same results can be accomplished with a rotary evaporator.

Figure 2:
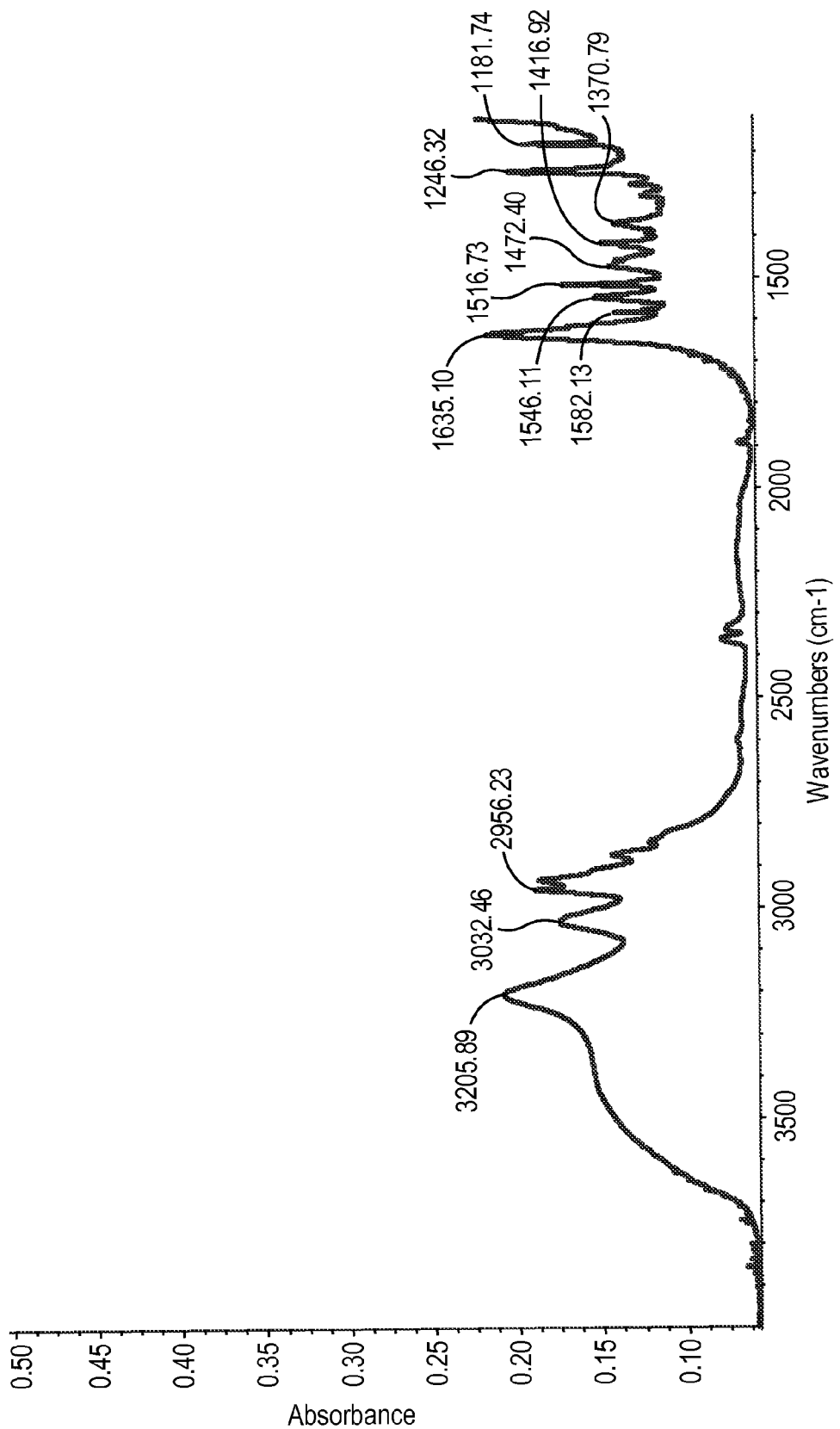
FIG. 2 is a graph of an FTIR spectrum of bufexamac.
Figure 3:
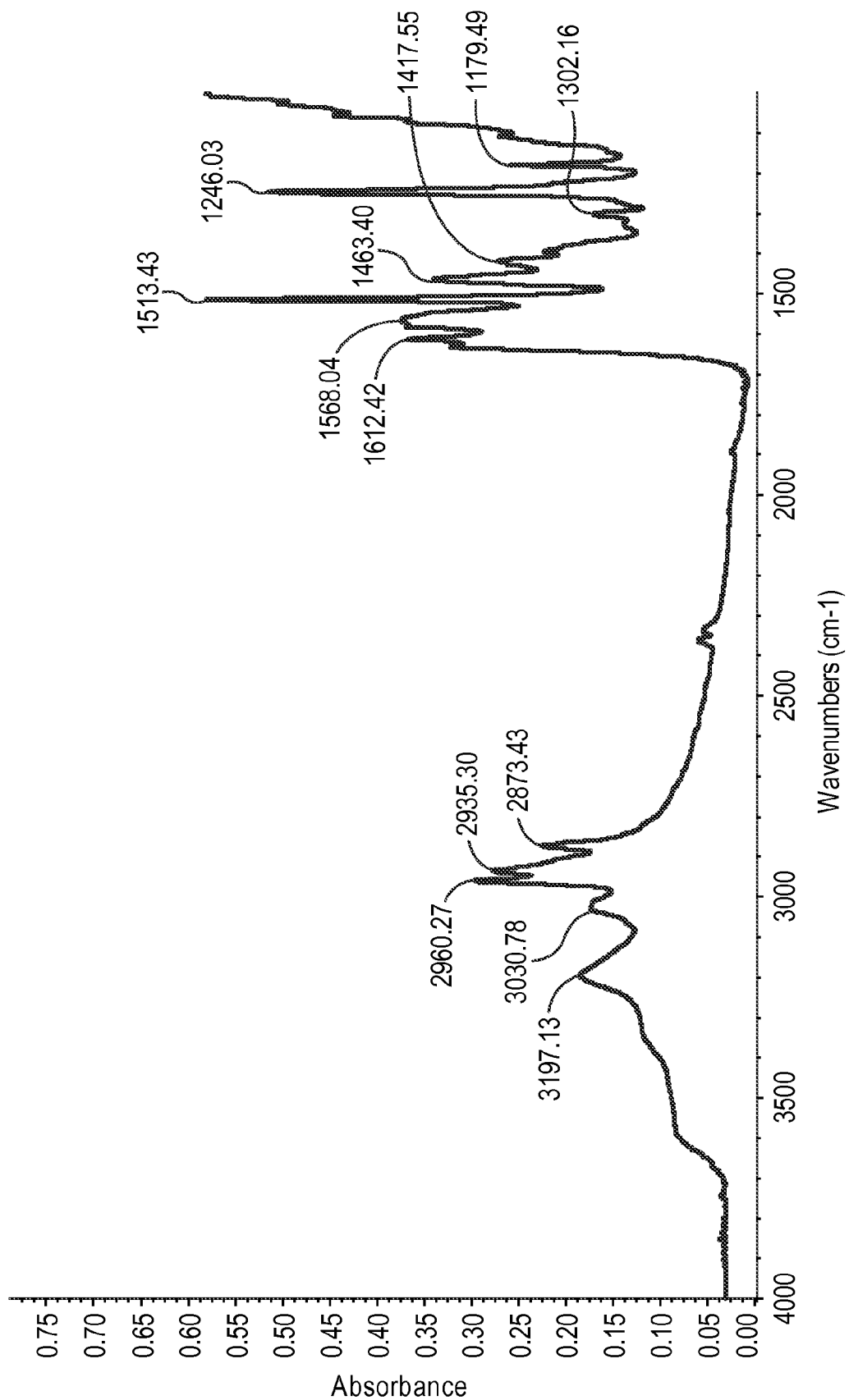
FIG. 3 is a graph of an FTIR spectrum of zirconia nanoparticles surface-modified with bufexamac.

FT-IR plates were prepared by using the cast-film method, except that the film was rinsed with acetone to remove any excess bufexamac. FIGS. 2 and 3 show the FT-IR spectra of bufexamac and bufexamac functionalized zirconia, respectively. In the case of bufexamac, strong peaks representing the ν(C=O) stretch and the aromatic ν(C—H) stretches were observed at 1635 cm⁻¹ and 1513 cm⁻¹, respectively. In contrast, the bufexamac functionalized zirconia showed no peak at 1635 cm⁻¹ and a new peak at 1613 cm⁻¹, which indicates bonding of bufexamac to the zirconia surface. A peak at 1513 cm⁻¹, indicates the presence of bufexamac. The characteristic carboxylate stretches at 1560 and 1327 cm⁻¹ are notably absent. The calculated frequency for the bound ν(C—O) stretch is 1619 cm⁻¹, which agrees very well with the observed frequency of 1613.

Stability of Bufexamac-Functionalized Zirconia in the Presence of Carboxylic Acids Vial 1 was charged with 1.1 grams of $ZrO_2$ sol (45.11% weight) and diluted with 4 mL of MPA. One equivalent of bufexamac (1.4 mmol/g $ZrO_2$) was added to the vial and the contents were shaken for 10 minutes. One equivalent of adipic acid (1.4 mmol/g $ZrO_2$) was then added to the vial and the contents were shaken for a few additional minutes. Adipic acid is a non-volatile dicarboxylic acid that forms a gel upon reaction with zirconia. Vial 2 (control) was charged with 1.1 grams of $ZrO_2$ sol (45.11% weight) and diluted with 4 mL of MPA. One equivalent of adipic acid (1.4 mmol/g $ZrO_2$) was then added to the vial and the contents were shaken for a few additional minutes. After shaking the fully charged vials, the contents were observed over time. Within 15 minutes, the contents of Vial 2 had formed a gel. In contrast, after 24 hours, the contents of Vial 1 had not formed a gel. This test demonstrates the stability of bufexamac-functionalized zirconia nanoparticles in the presence of carboxylic acids.

Example 2

Methacrylate Functionalized Zirconia Nanoparticles

Functionalized zirconia nanoparticles in which 80% of the surface sites were reacted with hydroxamic acid 2b (Preparatory Example 2) and 20% of the surface sites were reacted with hydroxamic acid 2a (Preparatory Example 1) were prepared as follows. A vial was charged with 2.2 grams $ZrO_2$ sol (47.3% solids weight) followed by 5 grams of 1-methoxy-2-propanol. Then 0.236 grams (1.12 mmol/g $ZrO_2$) of 2b and 0.064 grams (0.28 mmol/g $ZrO_2$) of 2a were added to the vial. The vial was stirred and heated to 50° C. for 1 hour. The solution was then dried down to a powder under a nitrogen gas purge at 100° C. Acetone solution was added to the resulting powder and the resulting slurry was agitated to disperse the powder. The mixture was centrifuged to collect the solids and the acetone solution was decanted from the mixture. The powder was rinsed with acetone as such three times to remove excess water, acetic acid, and hydroxamic acids. The product of this process was recovered and dried under a nitrogen gas purge at 100° C. for 2 hours. A total of 1.081 grams of zirconia nanoparticle powder was recovered. The powder was placed in a clean vial and redispersed in 2.25 grams of ultra-pure THF. The solution was 32.5 wt % $ZrO_2$. To this solution 0.175 grams of 2-isocyanatoethyl methacrylate (IEM) was added. The vial was sealed and heated to 55° C. for 1 hour. An FT-IR was taken of the sample, and IR peaks were observed at 1720 and 1771 cm⁻¹, and were attributed to the ν(C=O) stretches in the urethane and methacrylate groups.

Adhesives Containing Methacrylate-Functionalized Zirconia Nanoparticles

A solution of methacrylate-functionalized zirconia nanoparticles was prepared according to the procedure in Example 2. The solution containing the nanoparticles was added to a monomer solution containing iso-octyl acrylate (IOA) and acrylic acid (AA), where the IOA/AA weight ratio was 93/7. The solutions were mixed in 10 mL glass bottles in the quantities specified in Table 3. Then IRGACURE 651 (0.2% of the total monomer weight) was added to the mixture. The mixture was heated to 100° C. and purged with nitrogen to remove THF and oxygen from the mixture.

Using a knife coater, the resulting monomer and zirconia nanoparticle mixture was coated between silicone-coated polyethylene terephthalate (PET) release liners. The resulting coatings were polymerized using ultraviolet radiation under a fluorescent black light (about 680 millijoules/cm²) for 10 minutes. The amounts of zirconia added were determined by thermogravimetric analysis (TGA).

Figure 4:
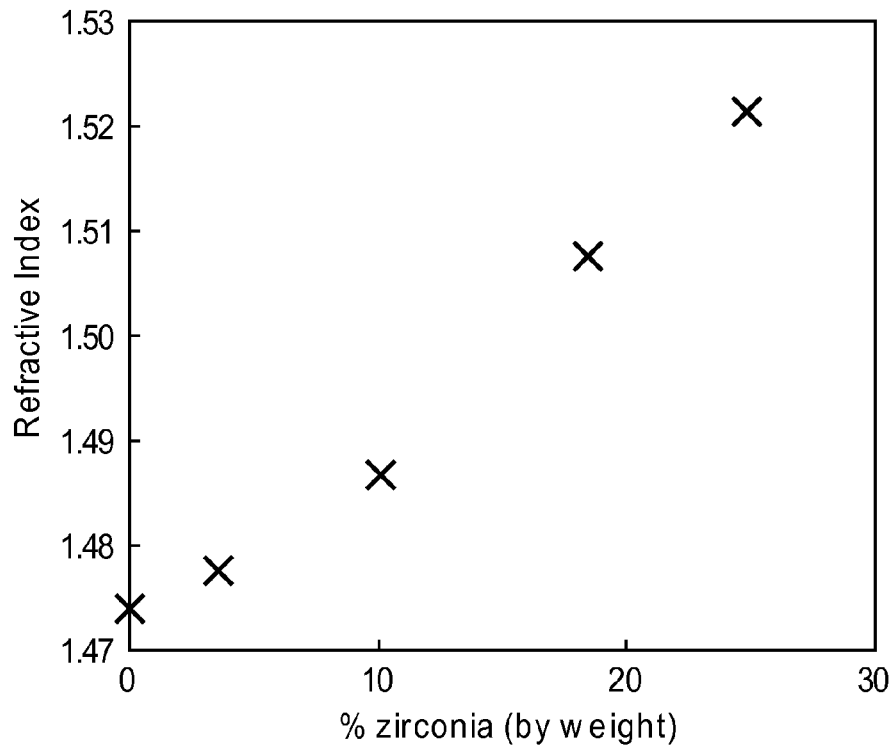
FIG. 4 is a graph of the refractive index vs. wt % surface-modified zirconia nanoparticles in a 93/7 IOA/AA adhesive.

The refractive indices of IOA/AA (93/7) adhesives with functionalized zirconia nanoparticles are listed in Table 3 and plotted in FIG. 4.

TABLE 3

Refractive Index of IOA/AA (93/7) Adhesives with Functionalized Zirconia Nanoparticles

| Methacrylate Functionalized Zirconia Solution (g) | Monomer Solution (g) | Functionalized Zirconia in Adhesive* (wt %) | Refractive Index |
|---|---|---|---|
| 0 | 5 | 0 | 1.4740 |
| 0.330 | 3 | 3.6 | 1.4776 |
| 0.625 | 2 | 10.1 | 1.4867 |
| 0.853 | 1.5 | 18.4 | 1.5075 |
| 1.149 | 1.5 | 24.8 | 1.5214 |

*Determined by TGA.

Example 3

Methylstyrene Functionalized Zirconia Nanoparticles

Functionalized zirconia nanoparticles in which 50%, 25%, and 25% of the surface sites reacted with bufexamac, 2a (Preparatory Example 1), and 2b (Preparatory Example 2), respectively, were prepared as follows. A clean vial was charged with 10 grams of $ZrO_2$ sol (47.3% weight) followed by 20 grams of 1-methoxy-2-propanol. Then 0.739 grams (0.70 mmol/g ZrO$_2$) of bufexamac, 0.383 grams (0.35 mmol/g ZrO$_2$) of 2a and 0.243 grams (0.35 mmol/g ZrO$_2$) 2b were added to the vial. The content of the vial was stirred for 2 hours. The solution was then dried down to a powder, under vacuum, at 70° C. A total of 4.93 grams of zirconia nanoparticle powder was recovered. The powder was placed in a clean vial and redispersed in 4.93 grams of ultra-pure THF to yield a clear, slightly yellow solution. To this solution 0.48 grams of 3-isopropenyl-α,α-dimethylbenzyl isocyanine was added. The vial was sealed and stirred for 12 hours at room temperature. An FT-IR was taken of the sample, and an IR peak was observed at 1751 cm$^{-1}$ and attributed to the ν(C=O) stretch in the urethane.

Iso-Octyl Acrylate/Biphenyloxy Ethyl Acrylate/Acrylic Acid (IOA/BPEA/AA) Adhesives A solution of functionalized zirconia nanoparticles was prepared according to the procedure in Example 3. To the solution of nanoparticles was added 4.93 grams of DMF. THF was removed by heating the solution to 70° C. under a nitrogen gas purge. The nanoparticle solution was added to a monomer solution containing iso-octyl acrylate (IOA), biphenyloxy ethyl acrylate (BPEA) and acrylic acid (AA), where the IOA/BPEA/AA ratio was 54/36/10. The solutions were mixed in 10 mL glass bottles in the quantities specified in Table 4. All solutions were clear with a slight blue color. Then IRGACURE 651 (0.2% of the total monomer weight) was added to the solution.

Figure 5:
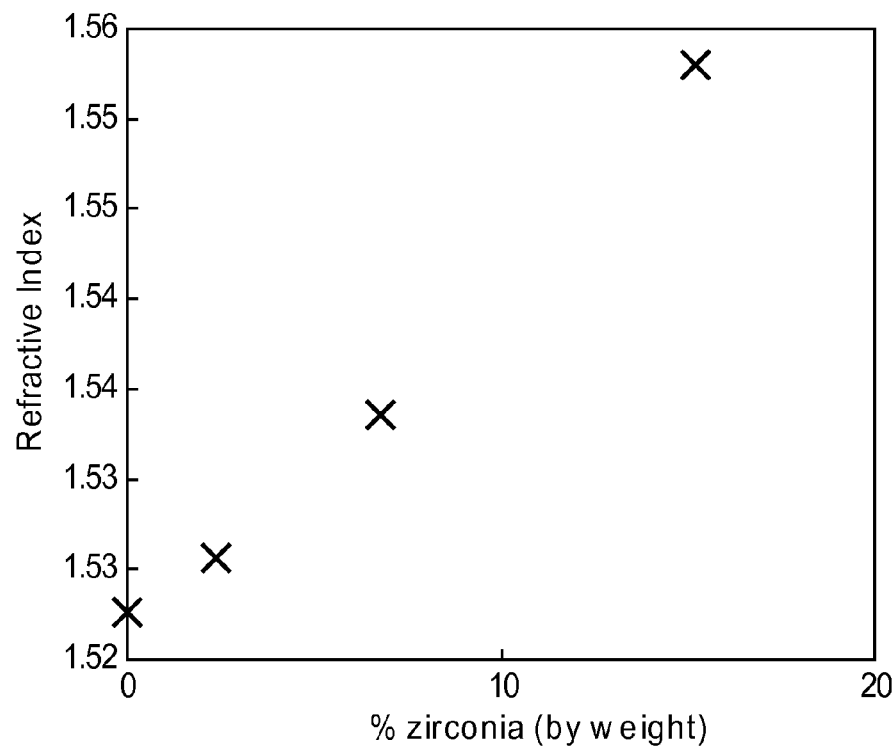
FIG. 5 is a graph of the refractive index vs. wt % surface-modified zirconia in a 54.36.3 IOA/BPEA/AA adhesive.

Using a knife coater, the resulting monomer and zirconia particle mixture was coated between silicone-coated PET release liners. The resulting coatings were polymerized using ultraviolet radiation under a fluorescent black light (about 680 millijoules/cm$^2$) for 15 minutes. One of the PET release liners was removed from the cured film and the film was dried at 80° C. for 12 hours to remove DMF from the film. The amount of zirconia added was determined by thermogravimetric analysis (TGA). The refractive indices of IOA/BPEA/AA (54/36/10) adhesives with functionalized zirconia nanoparticles are listed in Table 4 and plotted in FIG. 5.

TABLE 4

Refractive Index of IOA/BPEA/AA (54/36/10) Adhesives with Functionalized Zirconia Nanoparticles

| Functionalized Zirconia Solution (g) | Monomer Solution (g) | Functionalized Zirconia in Adhesive* (wt %) | Refractive Index |
| --- | --- | --- | --- |
| 0.0 | 2 | 0 | 1.5226 |
| 0.10 | 2 | 2.4 | 1.5256 |
| 0.32 | 2 | 6.8 | 1.5336 |
| 0.92 | 2 | 15.2 | 1.5530 |

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows. All references cited within are herein incorporated by reference in their entirety.

What is claimed is:

1. A composition comprising:
    an organic matrix, wherein the organic matrix comprises a pressure-sensitive adhesive; and
    surface-modified zirconia nanoparticles attached to at least a portion of the organic matrix,
wherein the surface-modified nanoparticles comprise at least one non-metallic organic derivatives comprising at least one hydroxamate functionality,
wherein the composition has an index of refraction greater than about 1.47.

2. A method of making the composition of claim 1 comprising:
    providing an aqueous sol of acetate-functionalized zirconia nanoparticles;
    combining at least one non-metallic organic derivative comprising at least one hydroxamate functionality, or a solution thereof, with a sol the to form a mixture; and
    removing water and displaced acetic acid from the mixture to form surface-modified nanoparticles; and
    blending the surface-modified nanoparticles with pressure-sensitive adhesive precursors to form an optically transparent or translucent mixture and;
    polymerizing the pressure-sensitive adhesive precursors to form the pressure sensitive adhesive.

3. The method according to claim 2, wherein the at least one non-metallic organic derivative further comprises a compatibilizing group.

4. The method according to claim 3, wherein the compatibilizing group is selected from hydroxyl, amino, thioether, thiol, carboxyl, carbonyl, alkylether, alkynyl, alkenyl, halogen groups, and combinations thereof.

5. The method according to claim 3, wherein the at least one compatibilizing group selected from alkyl, alkylene, heteroalkyl, aryl, arylene, and combinations thereof.

6. The method according to claim 2, wherein the at least one non-metallic organic derivative has the formula:

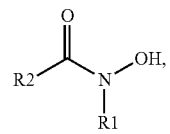

Wherein R1 is selected from the group consisting of hydrogen, an alkyl group, a cycloalkyl group, an aryl group, a heteroaryl group, an alkylaryl group, an alkylheteroaryl group and a heterocycloalkyl group, and
wherein R2 is selected from the group consisting of alkyl, alkylene, heteroalkyl, aryl, arylene and combinations thereof.

7. The method according to claim 6, wherein R2 further comprises at least one compatibilizing group selected from the group consisting of hydroxyl, amino, thioether, thiol, carboxyl, carbonyl, alkylether, alkynyl, alkenyl, halogen groups, and combinations thereof.

8. The composition according to claim 1, having an index of refraction greater than about 1.50.

9. The composition according to claim 8, wherein the pressure-sensitive adhesive has a refractive index of greater than about 1.52.

10. The composition according to claim 1, wherein the organic matrix is derived from monomers, oligomers, copolymers, or a combination thereof.

11. The composition according to claim 1 that is translucent or transparent.

12. The composition according to claim 1 that is radioopaque.

* * * * *

UNITED STATES PATENT AND TRADEMARK OFFICE
CERTIFICATE OF CORRECTION

PATENT NO. : 8,829,079 B2
APPLICATION NO. : 13/143978
DATED : September 9, 2014
INVENTOR(S) : Nathan Schultz et al.

Page 1 of 2

It is certified that error appears in the above-identified patent and that said Letters Patent is hereby corrected as shown below:

Title Page, items 12 and 75
Line 1, Delete "Shultz," and insert -- Schultz, --, therefor.

In the Specification

Column 1
Line 34, Delete "compatability" and insert -- compatibility --, therefor.

Column 2
Line 1, Delete "a sol the" and insert -- the sol --, therefor.

Column 7
Line 55, Delete "phenanthenyl," and insert -- phenanthrenyl, --, therefor.

Column 8
Line 13, Delete "polystryenes," and insert -- polystyrenes, --, therefor.

Column 8
Line 43, Delete "isobutyl" and insert -- isooctyl --, therefor.

Column 12
Line 13, Delete "Hainer," and insert -- Hafner, --, therefor.

Column 14
Line 11 (Approx.), Delete "Table" and insert -- Table. --, therefor.

Column 15
Line 43 (Approx.), Delete "[M+H]⁻ calcd. 146.1." and insert -- [M-H]⁻ calcd. 146.1, --, therefor.

Signed and Sealed this
Fifth Day of May, 2015

Michelle K. Lee
*Director of the United States Patent and Trademark Office*

Column 16
Line 22 (Approx.), Delete "[M+H]⁻ calcd. 230.2." and insert -- [M-H]⁻ calcd. 230.2, --, therefor.

Column 17
Line 2, Delete "[M+H]⁻ calcd. 194.1." and insert -- [M-H]⁻ calcd. 194.1, --, therefor.

Column 17
Line 52 (Approx.), Delete "210.1." and insert -- 210.1, --, therefor.

Column 18
Line 30 (Approx.), Delete "[M+H]⁻ calcd. 146.0." and insert -- [M-H]⁻ calcd. 146.0, -- therefor.

Column 19
Line 2-3, Delete "[M+H]⁻ calcd. 144.0." and insert -- [M-H]⁻ calcd. 144.0, --, therefor.

Column 19
Line 15, Delete "bufexemac" and insert -- bufexamac --, therefor.

In the Claims

Column 22
Line 17, In Claim 2, delete "a sol the" and insert -- the sol --, therefor.

Column 22
Line 44 (Approx.), In Claim 6, delete "Wherein" and insert -- wherein --, therefor.